United States Patent
Wang et al.

(10) Patent No.: US 9,749,573 B2
(45) Date of Patent: Aug. 29, 2017

(54) METHOD, DEVICE AND SYSTEM FOR CONTROLLING CABLE TELEVISION SYSTEM

(71) Applicant: ZTE Corporation, Shenzhen (CN)

(72) Inventors: Weiwei Wang, Shenzhen (CN); Linan Shi, Shenzhen (CN); Zhanyue Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/422,567

(22) PCT Filed: Aug. 15, 2013

(86) PCT No.: PCT/CN2013/081576
§ 371 (c)(1),
(2) Date: Apr. 9, 2015

(87) PCT Pub. No.: WO2014/029295
PCT Pub. Date: Feb. 27, 2014

(65) Prior Publication Data
US 2015/0229864 A1  Aug. 13, 2015

(30) Foreign Application Priority Data
Aug. 21, 2012  (CN) .......................... 2012 1 0299206

(51) Int. Cl.
*H04N 7/18* (2006.01)
*H04N 5/44* (2011.01)
(Continued)

(52) U.S. Cl.
CPC ........... *H04N 5/4403* (2013.01); *G08C 17/00* (2013.01); *G08C 17/02* (2013.01);
(Continued)

(58) Field of Classification Search
CPC ............. H04N 21/43615; H04N 7/106; H04N 5/4401; H04N 21/42204; H04N 21/43632;
(Continued)

(56) References Cited

U.S. PATENT DOCUMENTS 6,084,638 A * 7/2000 Hare .......................... G06F 3/14
348/552
6,205,318 B1 * 3/2001 Schindler ............. H04N 5/4401
345/212
(Continued)

FOREIGN PATENT DOCUMENTS

CN 101510965 A 8/2009
CN 101521732 A 9/2009
(Continued)

OTHER PUBLICATIONS

International Search Report for corresponding application PCT/CN2013/081576 filed Aug. 15, 2013.
(Continued)

*Primary Examiner* — Annan Shang
(74) *Attorney, Agent, or Firm* — Cantor Colburn LLP

(57) ABSTRACT

Disclosed are a method, a device and a system for controlling a cable television system. The method includes that: an intelligent mobile terminal detects whether the intelligent mobile terminal is connected to a home wireless network, and when it is detected that the intelligent mobile terminal is connected to the home wireless network, transmits a set-top box turn-on signal to a set-top box through the home wireless network; the set-top box executes a turn-on operation according to the received set-top box turn-on signal and transmits a television turn-on signal to a television. According to the disclosure, after a user of the intelligent mobile terminal gets home, the intelligent mobile terminal carried by the user automatically turns on the set-top box and the
(Continued)

television, and the user does not need to use a remote controller of the set-top box and a remote controller of the television.

9 Claims, 3 Drawing Sheets

(51) Int. Cl.
| | |
|---|---|
| H04N 21/41 | (2011.01) |
| H04N 21/422 | (2011.01) |
| H04N 21/436 | (2011.01) |
| H04N 21/443 | (2011.01) |
| G08C 17/00 | (2006.01) |
| G08C 17/02 | (2006.01) |
| H04L 12/28 | (2006.01) |

(52) U.S. Cl.
CPC ..... *H04L 12/2827* (2013.01); *H04N 21/4126* (2013.01); *H04N 21/4222* (2013.01); *H04N 21/43615* (2013.01); *H04N 21/443* (2013.01); *H04N 21/4432* (2013.01); *H04N 21/4436* (2013.01); *G08C 2201/40* (2013.01); *H04L 2012/285* (2013.01); *H04L 2012/2841* (2013.01); *H04N 2005/4426* (2013.01); *H04N 2005/4428* (2013.01)

(58) Field of Classification Search
CPC ......... H04N 21/43637; H04N 21/4622; H04N 21/2143; H04N 7/20; H04N 7/17318
USPC ..... 725/80, 133–134, 141–142, 153, 78, 81; 348/734
See application file for complete search history.

(56) References Cited

U.S. PATENT DOCUMENTS

| | | | | |
|---|---|---|---|---|
| 6,369,691 | B1* | 4/2002 | Chiu | H01C 10/16 338/132 |
| 7,715,790 | B1* | 5/2010 | Kennedy | H04M 1/7253 455/41.2 |
| 8,149,108 | B2* | 4/2012 | Hamel | A61B 1/00006 340/10.1 |
| 8,190,096 | B2* | 5/2012 | Rutjes | H04L 12/282 455/3.01 |
| 8,224,401 | B1* | 7/2012 | Schlichter | H04W 4/021 455/127.1 |
| 8,416,721 | B1* | 4/2013 | Chen | H04W 52/0209 320/138 |
| 8,456,284 | B2* | 6/2013 | Rigazio | G08C 17/00 340/12.22 |
| 8,495,686 | B2* | 7/2013 | Maddali | H04N 21/4126 709/219 |
| 8,725,195 | B2* | 5/2014 | Kajitani | G06F 1/1616 379/88.17 |
| 9,316,410 | B2* | 4/2016 | Meirav | F24H 3/06 |
| 2003/0172375 | A1* | 9/2003 | Shaw | G06F 1/1626 725/9 |
| 2004/0058707 | A1* | 3/2004 | Kobayashi | H04W 48/16 455/558 |
| 2004/0214617 | A1* | 10/2004 | Kanazawa | H04L 12/2823 455/574 |
| 2004/0242250 | A1* | 12/2004 | Sasai | H04W 56/002 455/502 |
| 2005/0186906 | A1 | 8/2005 | Hussmann | |
| 2005/0186988 | A1 | 8/2005 | Lim et al. | |
| 2006/0020993 | A1* | 1/2006 | Hannum | H04M 7/1215 725/111 |
| 2006/0248554 | A1* | 11/2006 | Priddy | G06K 9/00885 725/25 |
| 2008/0016544 | A1* | 1/2008 | Lee | H04N 7/163 725/134 |
| 2008/0059990 | A1* | 3/2008 | Marr | H04H 60/33 725/10 |
| 2008/0127257 | A1* | 5/2008 | Kvache | H04H 20/57 725/39 |
| 2008/0263579 | A1* | 10/2008 | Mears | G11B 27/322 725/9 |
| 2009/0149175 | A1* | 6/2009 | Lopresti | H04W 8/265 455/433 |
| 2010/0107186 | A1* | 4/2010 | Varriale | H04H 60/23 725/31 |
| 2011/0009075 | A1* | 1/2011 | Jantunen | G06K 7/0008 455/73 |
| 2011/0047598 | A1* | 2/2011 | Lindley | G06F 21/6245 726/4 |
| 2012/0036549 | A1* | 2/2012 | Patel | G06F 21/10 725/153 |
| 2012/0146918 | A1* | 6/2012 | Kreiner | H04M 1/7253 345/173 |
| 2012/0162537 | A1 | 6/2012 | Maddali et al. | |
| 2012/0260302 | A1* | 10/2012 | Harris | H04N 21/4126 725/133 |
| 2013/0023981 | A1* | 1/2013 | Dierking | A61F 2/848 623/1.35 |
| 2013/0072251 | A1* | 3/2013 | Kim | H04M 1/7253 455/550.1 |
| 2013/0171981 | A1 | 7/2013 | Koo | |
| 2013/0232524 | A1* | 9/2013 | Candelore | H04N 21/2585 725/30 |
| 2013/0268954 | A1* | 10/2013 | Hulten | H04N 21/442 725/12 |
| 2014/0139034 | A1* | 5/2014 | Sankar | H02J 17/00 307/104 |

FOREIGN PATENT DOCUMENTS

| | | |
|---|---|---|
| CN | 102833607 A | 12/2012 |
| JP | 2011061746 A | 3/2011 |
| WO | 2012036475 A2 | 3/2012 |

OTHER PUBLICATIONS

Supplemental European Search Report Application No. 13830932.3 dated Mar. 2, 2016; pp. 8.

* cited by examiner

METHOD, DEVICE AND SYSTEM FOR CONTROLLING CABLE TELEVISION SYSTEM

TECHNICAL FIELD

The disclosure relates to the field of mobile communication technology, and in particular to a method, a device and a system for controlling a cable television system.

BACKGROUND

With the continuous development of an intelligent mobile terminal technology and wireless network technology, the intelligent mobile terminal is gradually popularized. In order to log onto the network conveniently, more and more users of the intelligent mobile terminal install a home Wireless-Fidelity (Wi-Fi) network or home Bluetooth (BT) network. At present, the cable television system is widely used in homes to watch cable television program through a set-top box and a television. The television is one of the most frequently used appliances in the homes. People often turn on the set-top box and the television when getting home. In order to turn on the set-top box and the television, people often need to find a remote controller of the set-top box and the remote controller of the television, and then respectively control turn-on of the set-top box and the television through pressing the remote controller of the set-top box and the remote controller of the television. The turn-on operation is complex. People wish to turn on the set-top box and the television automatically through the intelligent mobile terminal carried by them after getting home, avoiding manual turn-on operation. However, at present, there is no method for turning on the set-top box and television automatically through the intelligent mobile terminal.

SUMMARY

In view of this, the embodiments of the disclosure provide a method, a device and a system for controlling a cable television system, by which automatic turn-on of a set-top box and a television through an intelligent mobile terminal is implemented.

The technical solution in an embodiment of the disclosure is implemented as follows.

An embodiment of the disclosure provides a method for controlling a cable television system, including that:

an intelligent mobile terminal detects whether the intelligent mobile terminal is connected to a home wireless network, and when it is detected that the intelligent mobile terminal is connected to the home wireless network, transmits a set-top box turn-on signal to a set-top box through the home wireless network; and the set-top box executes a turn-on operation according to the received set-top box turn-on signal and transmits a television turn-on signal to a television.

Preferably, transmitting the set-top box turn-on signal to the set-top box through the home wireless network includes:

transmitting the set-top box turn-on signal to the set-top box periodically through the home wireless network according to a predetermined frequency;

correspondingly, after transmitting the television turn-on signal to the television, the method further includes that:

the set-top box determines whether the set-top box turn-on signal transmitted by the intelligent mobile terminal is received within a predetermined time interval, when the set-top box turn-on signal is not received, executes a turn-off operation, and transmits a television turn-off signal to the television.

Preferably, the home wireless network is a home Wireless-Fidelity (Wi-Fi) network or a home Bluetooth (BT) network.

Preferably, transmitting the television turn-on signal to the television includes:

transmitting the television turn-on or turn-off signal to the television through a High Definition Multimedia Interface (HDMI).

Preferably, transmitting the television turn-on signal to the television includes:

transmitting, by the set-top box, a Wi-Fi or BT television turn-on or turn-off signal to an infrared transmitter through the Wi-Fi or BT network, and converting, by the infrared transmitter, the received Wi-Fi or BT television turn-on or turn-off signal into an infrared television turn-on or turn-off signal, and then transmitting the same to the television.

An embodiment of the disclosure provides an intelligent mobile terminal, including a detection component and a transmission component, wherein the detection component is configured to detect whether the intelligent mobile terminal is connected to a home wireless network, and when it is detected that the intelligent mobile terminal is connected to the home wireless network, notify the transmission component to execute an operation of transmitting a set-top box turn-on signal to a set-top box; and the transmission component is configured to transmit the set-top box turn-on signal to the set-top box through the home wireless network according to the notification from the the detection component.

Preferably, the transmission component is specifically configured to transmit the set-top box turn-on signal to the set-top box periodically through the home wireless network according to a predetermined frequency.

An embodiment of the disclosure provides a set-top box, including a turn-on component and a transmission component, wherein the turn-on component is configured to execute a turn-on operation according to a set-top box turn-on signal transmitted from an intelligent mobile terminal; and the transmission component is configured to transmit a television turn-on signal to a television according to the set-top box turn-on signal transmitted from the intelligent mobile terminal.

Preferably, the set-top box further includes a turn-off component, wherein the turn-off component is configured to determine whether the set-top box turn-on signal transmitted from the intelligent mobile terminal is received within a predetermined time interval, when the set-top box turn-on signal is not received, execute a turn-off operation, and notify the transmission component to execute an operation of transmitting a turn-off signal to the television; and correspondingly, the transmission component is further configured to transmit a television turn-off signal to the television according to a notification from the turn-off component.

An embodiment of the disclosure provides a system for controlling a cable television system, including: an intelligent mobile terminal and a set-top box, wherein the intelligent mobile terminal is configured to detect whether the intelligent mobile terminal is connected to a home wireless network, and when it is detected that the intelligent mobile terminal is connected to the home wireless network, transmit a set-top box turn-on signal to a set-top box through the home wireless network; and the set-top box is configured to perform a turn-on operation according to the set-top box turn-on signal transmitted from the intelligent mobile terminal and transmit a television turn-on signal to a television.

Preferably, the intelligent mobile terminal is configured to transmit the set-top box turn-on signal to the set-top box periodically through the home wireless network according to a predetermined frequency; and the set-top box is also configured to determine whether the set-top box turn-on signal transmitted by the intelligent mobile terminal is received within a predetermined time interval, when the set-top box turn-on signal is not received, execute a turn-off operation, and transmit a television turn-off signal to the television.

It can be seen from the above that the embodiments of the present disclosure adopt the following technical solution: an intelligent mobile terminal detects whether the intelligent mobile terminal is connected to a home wireless network, and when it is detected that the intelligent mobile terminal is connected to the home wireless network, transmits a set-top box turn-on signal to a set-top box through the home wireless network; the set-top box executes a turn-on operation according to the received set-top box turn-on signal and transmits a television turn-on signal to a television. Thus, according to the embodiments of the disclosure, after a user of the intelligent mobile terminal gets home, the intelligent mobile terminal carried by the user automatically turns on the set-top box and the television, and the user does not need to use a remote controller of the set-top box and a remote controller of the television to turn on the set-top box and the television respectively. Thereby the inconvenience caused by manually turning on the set-top box and the television can be avoided.

DETAILED DESCRIPTION OF THE EMBODIMENTS

The basic idea of the disclosure is that: an intelligent mobile terminal detects whether the intelligent mobile terminal is connected to a home wireless network, and when it is detected that the intelligent mobile terminal is connected to the home wireless network, transmits a set-top box turn-on signal to a set-top box through the home wireless network; the set-top box executes a turn-on operation according to the received set-top box turn-on signal and transmits a television turn-on signal to a television.

Figure 1:
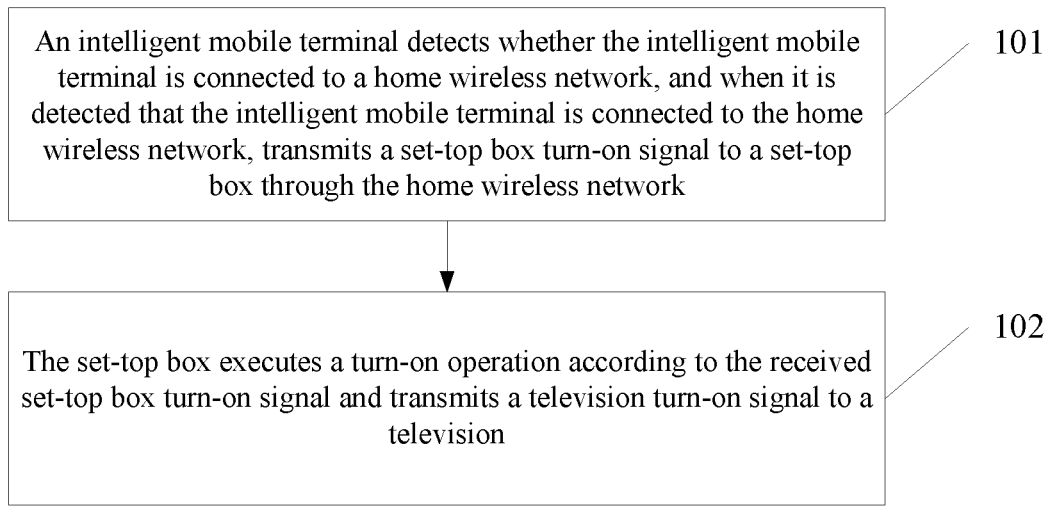
FIG. 1 is a flowchart of a method for controlling a cable television system according to a first embodiment of the disclosure.

A method for controlling a cable television system according to a first embodiment of the disclosure is as shown in FIG. 1. The method includes:

Step 101: an intelligent mobile terminal detects whether the intelligent mobile terminal is connected to a home wireless network, and when it is detected that the intelligent mobile terminal is connected to the home wireless network, transmits a set-top box turn-on signal to a set-top box through the home wireless network; and Step 102: the set-top box executes a turn-on operation according to the received set-top box turn-on signal and transmits a television turn-on signal to a television.

Preferably, transmitting the set-top box turn-on signal to the set-top box through the home wireless network in Step 101 may include: transmitting the set-top box turn-on signal to the set-top box periodically through the home wireless network according to a predetermined frequency;

correspondingly, after transmitting the television turn-on signal to the television in Step 102, the method further includes that:

the set-top box determines whether the set-top box turn-on signal transmitted by the intelligent mobile terminal is received within a predetermined time interval, when the set-top box turn-on signal is not received, executes a turn-off operation, and transmits a television turn-off signal to the television.

Preferably, the home wireless network may be a home Wireless-Fidelity (Wi-Fi) network or a home Bluetooth (BT) network.

Preferably, transmitting the television turn-on signal to the television may include: transmitting the television turn-on or turn-off signal to the television through a High Definition Multimedia Interface (HDMI).

Preferably, transmitting the television turn-on signal to the television may include: transmitting, by the set-top box, a Wi-Fi or BT television turn-on or turn-off signal to an infrared transmitter through the Wi-Fi or BT network, and converting, by the infrared transmitter, the received Wi-Fi or BT television turn-on or turn-off signal into an infrared television turn-on or turn-off signal, and then transmitting the same to the television.

Figure 2:
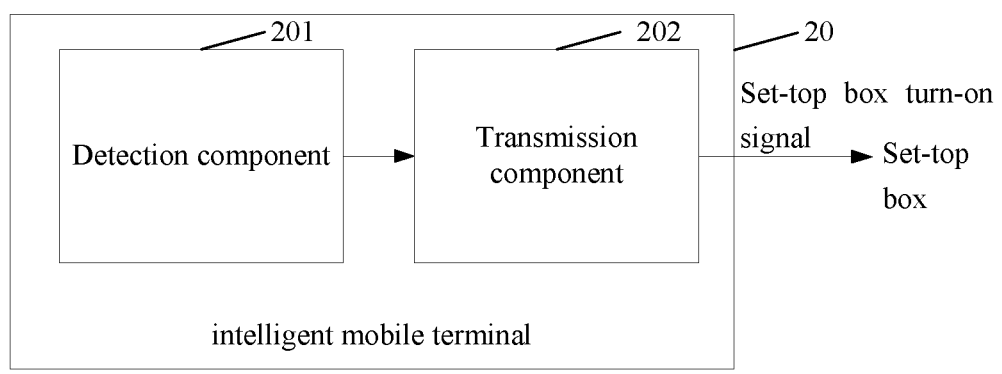
FIG. 2 is a structural diagram of an intelligent mobile terminal according to of an embodiment of the disclosure.

An intelligent mobile terminal according to an embodiment of the disclosure is as shown in FIG. 2. The intelligent mobile terminal 20 may include: a detection component 201 and a transmission component 202, wherein the detection component 201 is configured to detect whether the intelligent mobile terminal 20 is connected to a home wireless network, and when it is detected that the intelligent mobile terminal 20 is connected to the home wireless network, notify a transmission component 202 to execute an operation of transmitting a set-top box turn-on signal to a set-top box; and the transmission component 202 is configured to transmit the set-top box turn-on signal to the set-top box through the home wireless network according to a notification of the detection component 201.

Preferably, the transmission component 202 may be specifically configured to transmit the set-top box turn-on signal to the set-top box periodically through the home wireless network according to a predetermined frequency.

In the practical application, the detection component 201 and the transmission component 202 in the intelligent mobile terminal 20 may be implemented by a Central Processing Unit (CPU), a Digital Signal Processor (DSP) or a Field Programmable Gate Array (FPGA).

Figure 3:
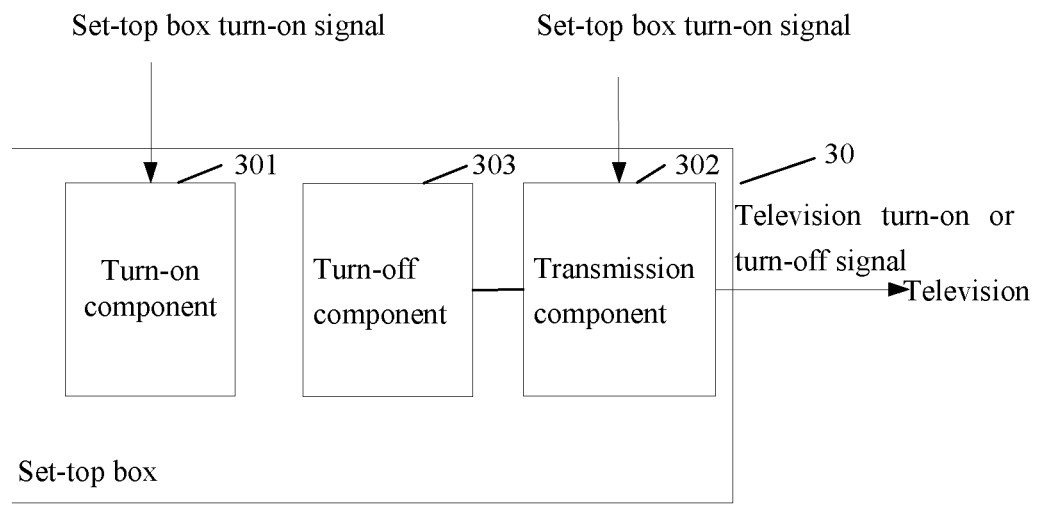
FIG. 3 is a structural diagram of a set-top box according to an embodiment of the disclosure.

A set-top box according to an embodiment of the disclosure is as shown in FIG. 3. The set-top box 30 may include: a turn-on component 301 and a transmission component 302, wherein the turn-on component 301 is configured to execute a turn-on operation according to a set-top box turn-on signal transmitted from an intelligent mobile terminal; and the transmission component is configured to transmit a television turn-on signal to a television according to the set-top box turn-on signal transmitted from the intelligent mobile terminal.

Preferably, the set-top box 30 further includes a turn-off component 303, wherein the turn-off component 303 is configured to determine whether the set-top box turn-on signal transmitted from the intelligent mobile terminal is received within a predetermined time interval, when the set-top box turn-on signal is not received, execute a turn-off operation, and notify the transmission component 302 to execute an operation of transmitting a turn-off signal to the television; and correspondingly, the transmission component 302 is further configured to transmit a television turn-off signal to the television according to a notification of the turn-off component 303.

In the practical application, the turn-on component 301, the transmission component 302 and the turn-off component 303 in the set-top box 30 may be implemented by a Central Processing Component (CPU), a Digital Signal Processor (DSP) or a Field Programmable Gate Array (FPGA).

Figure 4:
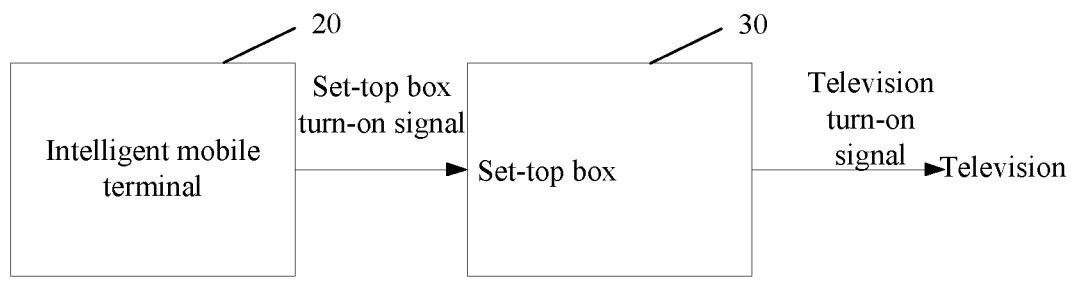
FIG. 4 is a structural diagram of a system for controlling a cable television system according to an embodiment of the disclosure.

A system for controlling a cable television system according to an embodiment of the disclosure is as shown in FIG. 4. The system may include an intelligent mobile terminal 20 and a set-top box 30, wherein the intelligent mobile terminal 20 is configured to detect whether the intelligent mobile terminal is connected to a home wireless network, and when it is detected that the intelligent mobile terminal is connected to the home wireless network, transmit a set-top box turn-on signal to a set-top box 30 through the home wireless network; and the set-top box 30 is configured to perform a turn-on operation according to the set-top box turn-on signal transmitted from the intelligent mobile terminal 20 and transmit a television turn-on signal to a television.

Preferably, the intelligent mobile terminal 20 may be configured to transmit the set-top box turn-on signal to the set-top box periodically through the home wireless network according to a predetermined frequency; and the set-top box 30 is further configured to determine whether the set-top box turn-on signal transmitted by the intelligent mobile terminal 20 is received within a predetermined time interval, when the set-top box turn-on signal is not received, execute a turn-off operation, and transmit a television turn-off signal to the television.

Figure 5:
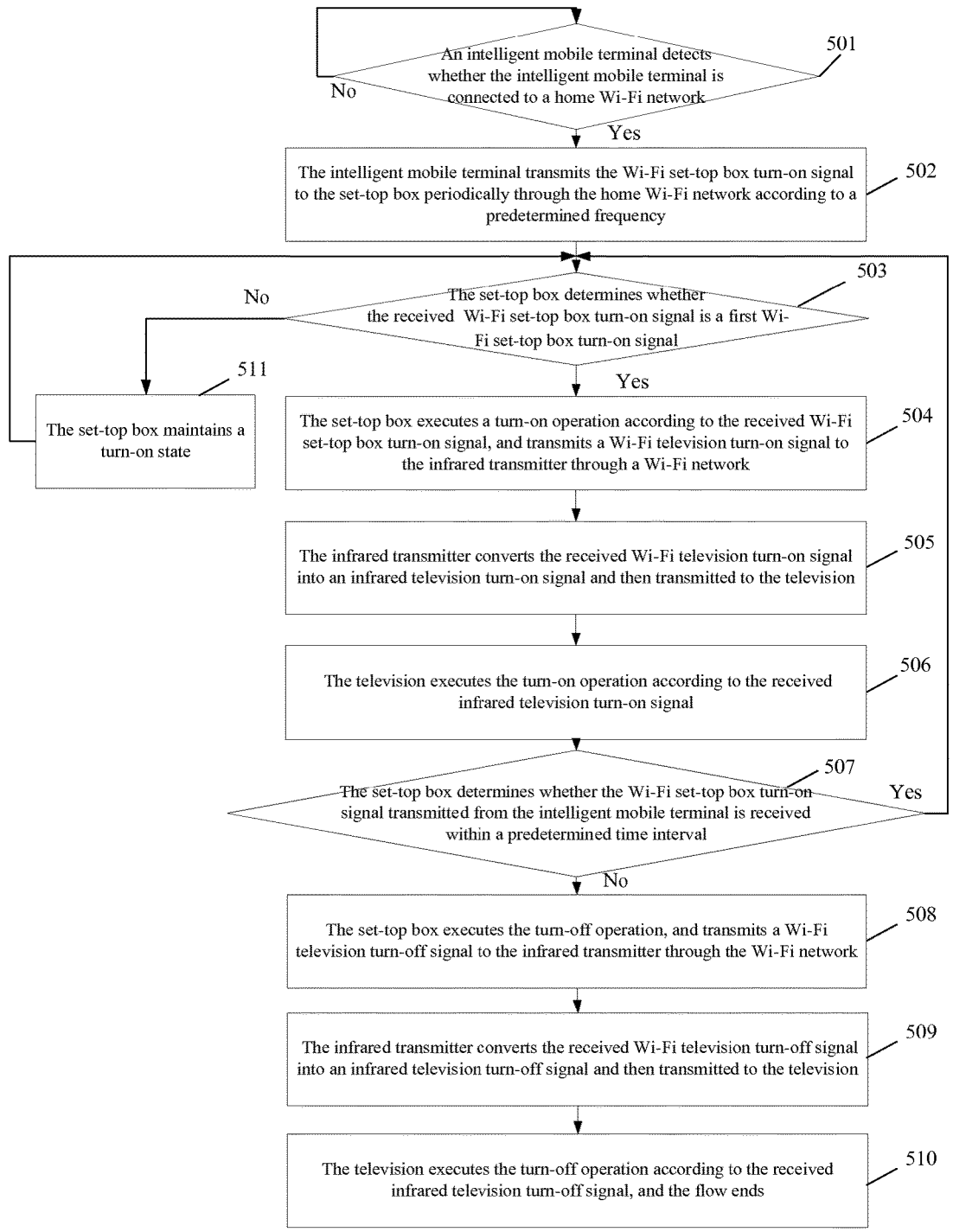
FIG. 5 is a flowchart of a method for controlling a cable television system according to a second embodiment of the disclosure.

A method for controlling a cable television system according to a second embodiment of the disclosure is introduced below. In the embodiment, an infrared transmitter is adopted, and a home wireless network adopts a home Wi-Fi network. As shown in FIG. 5, the method includes the following steps.

Step 501: An intelligent mobile terminal detects whether the intelligent mobile terminal is connected to a home Wi-Fi network, and when it is detected that the intelligent mobile terminal is not connected to the home Wi-Fi network, Step 501 is repeated; when it is detected that the intelligent mobile terminal is connected to the home Wi-Fi network, Step 502 is executed.

Step 502: The intelligent mobile terminal transmits a Wi-Fi set-top box turn-on signal to the set-top box periodically through the home Wi-Fi network according to a predetermined frequency.

Here, the frequency may be set by a user according to requirements, for example the Wi-Fi set-top box turn-on signal is transmitted every 10 minutes.

Step 503: The set-top box determines whether the received Wi-Fi set-top box turn-on signal is a first Wi-Fi set-top box turn-on signal, when the received Wi-Fi set-top box turn-on signal is the first Wi-Fi set-top box turn-on signal, Step 504 is executed; when the received Wi-Fi set-top box turn-on signal is not the first Wi-Fi set-top box turn-on signal, Step 511 is executed.

Step 504: The set-top box executes a turn-on operation according to the received Wi-Fi set-top box turn-on signal, and transmits a Wi-Fi television turn-on signal to the infrared transmitter through a Wi-Fi network.

Here, the set-top box first converts the received Wi-Fi set-top box turn-on signal into a standard set-top box turn-on signal, and then executes the turn-on operation according to the converted standard set-top box turn-on signal.

The infrared transmitter may be integrated inside the set-top box, and may be provided independently.

Step 505: The infrared transmitter converts the received Wi-Fi television turn-on signal into an infrared television turn-on signal and then transmitted to the television.

Step 506: The television executes the turn-on operation according to the received infrared television turn-on signal.

Step 507: The set-top box determines whether the Wi-Fi set-top box turn-on signal transmitted from the intelligent mobile terminal is received within a predetermined time interval, when the Wi-Fi set-top box turn-on signal is not received, Step 508 is executed; when the Wi-Fi set-top box turn-on signal is received, Step 503 is returned.

Here, the predetermined time interval is more than the predetermined frequency, for example, the time interval may be set to 30 min.

Step 508: The set-top box executes the turn-off operation, and transmits a Wi-Fi television turn-off signal to the infrared transmitter through the Wi-Fi network.

Step 509: The infrared transmitter converts the received Wi-Fi television turn-off signal into an infrared television turn-off signal and then transmitted the same to the television.

Step 510: The television executes the turn-off operation according to the received infrared television turn-off signal, and the flow ends.

Step 511: The set-top box maintains a turn-on state, and Step 503 is returned.

It can be seen from the above that according to the disclosure, after a user of the intelligent mobile terminal gets home, the intelligent mobile terminal carried by the user automatically turns on the set-top box and the television, and after the user of the intelligent mobile terminal leaves home, the set-top box and the television automatically turn off. Thereby the inconvenience caused by manually turning on and turning off the set-top box and the television can be avoided.

The above are only the preferred embodiments of the disclosure and not intended to limit the scope of protection of the disclosure.

INDUSTRIAL APPLICABILITY

Disclosed are a method, a device and a system for controlling a cable television system. The method includes that: an intelligent mobile terminal detects whether the intelligent mobile terminal is connected to a home wireless network, and when it is detected that the intelligent mobile terminal is connected to the home wireless network, transmits a set-top box turn-on signal to a set-top box through the home wireless network; the set-top box executes a turn-on operation according to the received set-top box turn-on signal and transmits a television turn-on signal to a television. According to the disclosure, after a user of the intelligent mobile terminal gets home, the intelligent mobile terminal carried by the user automatically turns on the set-top box and the television, and the user does not need to use a remote controller of the set-top box and a remote controller of the television to turn on the set-top box and the television respectively. Thereby the inconvenience caused by manually turning on the set-top box and the television can be avoided.

What is claimed is:

1. A method for controlling a cable television system, comprising:
    detecting, by an intelligent mobile terminal, whether the intelligent mobile terminal is connected to a home wireless network, and when it is detected that the intelligent mobile terminal is connected to the home wireless network, transmitting a set-top box turn-on signal to a set-top box through the home wireless network; and
    performing, by the set-top box, a turn-on operation according to the received set-top box turn-on signal and transmitting a television turn-on signal to a television;
    wherein transmitting the set-top box turn-on signal to the set-top box through the home wireless network comprises:
    transmitting the set-top box turn-on signal to the set-top box periodically through the home wireless network according to a predetermined frequency;
    determining by the set-top box, whether the set-top box turn-on signal transmitted by the intelligent mobile terminal is received within a predetermined time interval,
    when the set-top box turn-on signal is not received within the predetermined time interval, executing a turn-off operation, and transmitting a television turn-off signal to the television.

2. The method according to claim 1, wherein the home wireless network is a home Wireless-Fidelity (Wi-Fi) network or a home Bluetooth (BT) network.

3. The method according to claim 2, wherein transmitting the television turn-on signal to the television comprises:
    transmitting the television turn-on or turn-off signal to the television through a High Definition Multimedia Interface (HDMI).

4. The method according to claim 2, wherein transmitting the television turn-on signal to the television comprises:
    transmitting, by the set-top box, a Wi-Fi or BT television turn-on or turn-off signal to an infrared transmitter through the Wi-Fi or BT network, and converting, by the infrared transmitter, the received Wi-Fi or BT television turn-on or turn-off signal into an infrared television turn-on or turn-off signal, and then transmitting the infrared television turn-on or turn-off signal to the television.

5. The method according to claim 1, wherein the home wireless network is a home Wireless-Fidelity (Wi-Fi) network or a home Bluetooth (BT) network.

6. The method according to claim 5, wherein transmitting the television turn-on signal to the television comprises:
    transmitting the television turn-on or turn-off signal to the television through a High Definition Multimedia Interface (HDMI).

7. The method according to claim 5, wherein transmitting the television turn-on signal to the television comprises:
    transmitting, by the set-top box, a Wi-Fi or BT television turn-on or turn-off signal to an infrared transmitter through the Wi-Fi or BT network, and converting, by the infrared transmitter, the received Wi-Fi or BT television turn-on or turn-off signal into an infrared television turn-on or turn-off signal, and then transmitting the infrared television turn-on or turn-off signal to the television.

8. An intelligent mobile terminal, comprising: a detection component and a transmission component, wherein
    the detection component is configured to detect whether the intelligent mobile terminal is connected to a home wireless network, and when it is detected that the intelligent mobile terminal is connected to the home wireless network, notify the transmission component to execute an operation of transmitting a set-top box turn-on signal to a set-top box; and
    the transmission component is configured to transmit the set-top box turn-on signal to the set-top box through the home wireless network according to the notification from the the detection component;
    wherein the transmission component is configured to transmit the set-top box turn-on signal to the set-top box periodically through the home wireless network according to a predetermined frequency;
    when the set-top box turn-on signal is not received within the predetermined time interval, execute a turn-off operation; and notify the transmission component to execute an operation of transmitting the turn-off signal to the television.

9. A set-top box, comprising: a turn-on component, a transmission component, and a turn-off component, wherein
    the turn-on component is configured to execute a turn-on operation according to a set-top box turn-on signal transmitted from an intelligent mobile terminal; and
    the transmission component is configured to transmit a television turn-on signal to a television according to the set-top box turn-on signal transmitted from the intelligent mobile terminal and to transmit a turn-off signal to the television according to receiving a notification from the turn-off component;
    the turn-off component is configured to:
        determine whether the set-top box turn-on signal transmitted from the intelligent mobile terminal is received within a predetermined time interval;
        when the set-top box turn-on signal is not received within the predetermined time interval, execute a turn-off operation; and
        notify the transmission component to execute an operation of transmitting the turn-off signal to the television.

* * * * *